(12) United States Patent
Jovanovich et al.

(10) Patent No.: US 6,327,312 B1
(45) Date of Patent: Dec. 4, 2001

(54) RF NARROWBAND/WIDEBAND DISCRIMINATING SYSTEM FOR SPREAD SPECTRUM SIGNAL DIFFERENTIATION

(75) Inventors: Alan F. Jovanovich, Des Moines; John W. Mensonides, Monroe; Bruce G. Warren, Poulsbo, all of WA (US)

(73) Assignee: Intermec IP Corp., Woodland Hills, CA (US)

( * ) Notice: Subject to any disclaimer, the term of this patent is extended or adjusted under 35 U.S.C. 154(b) by 0 days.

(21) Appl. No.: 09/103,422

(22) Filed: Jun. 24, 1998

(51) Int. Cl.$^7$ .................................................. H04L 27/06
(52) U.S. Cl. ............................................ 375/316; 455/134
(58) Field of Search .................................... 375/316, 324, 375/340, 342, 345, 344, 136; 455/154.1, 134, 135, 136, 161.3, 226.2, 226.4, 226.1, 67.1, 234.1, 234.2, 10; 342/91, 392

(56) References Cited

U.S. PATENT DOCUMENTS

| | | |
|---|---|---|
| 4,985,899 | 1/1991 | Walsh . |
| 5,303,413 * | 4/1994 | Braegas ................................ 455/266 |
| 5,307,515 * | 4/1994 | Kuo et al. ............................. 455/295 |
| 5,617,060 * | 4/1997 | Wilson et al. ........................ 330/129 |
| 5,689,814 * | 11/1997 | Hagisawa et al. ..................... 455/69 |
| 5,745,856 * | 4/1998 | Dent ...................................... 455/552 |
| 5,867,766 * | 2/1999 | Dinc et al. ............................. 455/62 |
| 6,212,173 * | 4/2001 | Lindsay et al. ....................... 370/331 |

* cited by examiner

Primary Examiner—Chi Pham
Assistant Examiner—Emmanuel Bayard
(74) Attorney, Agent, or Firm—O'Melveny & Myers LLP

(57) ABSTRACT

A radio receiver discriminates between narrowband and wideband radio frequency (RF) signals on the basis of the rate of increase of the integrated energy level of the received signal. The receiver comprises a receive section adapted to receive and downconvert RF input signals to intermediate frequency (IF) signals, and a received signal strength indicator coupled to the receive section and providing a receiver energy signal corresponding to the energy of the IF signals. A discrimination section receives the energy signal, and determines whether the RF input signals are narrowband or wideband by detecting the rate of increase of the integrated level of the receiver energy signal. The discrimination section further comprises a first threshold detector providing a first triggering signal upon the integrated level of the receiver energy signal reaching a first level, a second threshold detector providing a second triggering signal upon the integrated level of the receiver energy signal reaching a second level, and a timer providing a timing signal corresponding to elapsed time between the first and second triggering signal. The RF input signals comprise wideband signals when the timing signal is less than a predetermined value, and narrowband signals when the timing signal is at least equal to the predetermined value.

20 Claims, 2 Drawing Sheets

RF NARROWBAND/WIDEBAND DISCRIMINATING SYSTEM FOR SPREAD SPECTRUM SIGNAL DIFFERENTIATION

BACKGROUND OF THE INVENTION

1. Field of the Invention

The present invention relates to computing devices that communicate with each other within a wireless local area network, and more particularly, to computing devices that operate in an environment in which both frequency-hopping and direct-sequence spread spectrum radio frequency signals are present and which are capable of discriminating between both types of RF signals.

2. Description of Related Art

A wireless local area network (WLAN) comprises a plurality of remote computing devices which communicate together over radio frequency (RF) signals. As in a wired local area network (LAN), the WLAN allows users to seamlessly access disk drives, printers, and additional computer resources connected to the WLAN. The remote computing devices include a radio receiver/transmitter specifically designed or adapted for RF communication with the other elements of the WLAN. The WLAN may also include a central host processing unit that sends information to and receives information from any one of the plurality of remotely disposed computing devices. The central host processor may also form part of a separate wired LAN to provide a bridge with the WLAN. In such a WLAN, the remote computing devices may comprise portable units that operate within a defined environment to report information back to the central host processing unit. WLAN systems offer increased flexibility over wired LAN systems by enabling operators of the remote computing devices substantial freedom of movement through the environment, and are particularly useful for remote data collection applications such as inventory control, manufacturing and production flow management, and asset tracking.

For simplicity, the radio receiver/transmitter provided within each remote computing device may communicate using conventional narrowband RF signals. Narrowband RF operation has a significant drawback in that the radio receiver/transmitter must be operated at relatively low power levels in order to ensure compliance with certain governmental regulations, and at such low power levels the RF signals are highly susceptible to interference and have low data throughput rates. To overcome these and other drawbacks, commercial WLAN systems have adopted so-called "spread spectrum" modulation techniques. In a spread spectrum system, the transmitted signal is spread over a frequency band that is significantly wider than the minimum bandwidth required to transmit the information being sent. As a result of the signal spreading, spread spectrum systems enable high data integrity and security. Moreover, by spreading transmission power across a broad bandwidth, power levels at any given frequency within the bandwidth are significantly reduced, thereby reducing interference to other radio devices.

In one type of spread spectrum communication system, a modulated RF carrier is moved in discrete increments in a pattern dictated by a pseudorandom sequence. This type of spread spectrum system is known as a "frequency-hopping" modulation system, since the transmitter jumps from frequency to frequency in accordance with the pseudorandom sequence. The information signal is modulated onto the shifting carrier using frequency shift keying (FSK) or other known types of modulation. The instantaneous frequency-hopping spread spectrum signals are similar to conventional narrowband RF communications, except that the center frequency of the signals moves in the pseudorandom sequence with the carrier impressed upon the center frequency.

A second type of spread spectrum communication system utilizes an RF carrier modulated by a digital code sequence having a spreading code rate, or chipping rate, much higher than the clock rate of the information signal. This type of spread spectrum system is known as a "direct-sequence" modulation system, and the modulated signals have a much wider bandwidth than narrowband RF signals or frequency-hopping signals for an equivalent data rate. The RF carrier may be modulated such that a data stream has one phase when a spreading code sequence represents a data "one" and 180° phase shift when the spreading code sequence represents a data "zero." The RF carrier may also be binary or quadrature modulated by one or more data streams such that the data streams have one phase when a spreading code sequence represents a data "one" and a predetermined phase shift (e.g., 180° for binary, and 90° for quadrature) when the spreading code sequence represents a data "zero." These types of modulation are commonly referred to as binary shift key (BPSK) and quadrature shift key (QPSK) modulation, respectively.

It is sometimes desirable to operate remote computing devices in an environment in which both direct-sequence (i.e., wideband) and frequency-hopping (i.e., narrowband) RF communications are present simultaneously. For example, a single WLAN may include disparate elements operating in each of the two modes while sharing a single common host processing unit. In such an environment, it is necessary for the receiver circuitry within the remote computing devices to differentiate between the two types of signals to avoid performance impacts. If an interfering narrowband signal is erroneously interpreted by the receiver as a valid information signal, the receiver could hold off other pending transmissions while trying to synchronize to the narrowband signal, resulting in reduced system throughput and degraded performance. The problem of interference between wideband and narrowband signals is not limited to WLANs utilizing spread spectrum communications techniques, but may also be experienced in any RF environment in which both narrowband and wideband signals are present.

Thus, it would be desirable to provide a receiver which can discriminate between narrowband and wideband RF signals for use in an environment in which both types of signals are present.

SUMMARY OF THE INVENTION

In accordance with the teachings of the present invention, a receiver is provided which can discriminate between narrowband and wideband radio frequency (RF) signals. The receiver monitors the energy of the received RF signals, and discriminates between narrowband and wideband on the basis of the rate of increase of the signal energy level, wherein wideband signals are presumed to contain greater integrated energy than the relatively short time duration narrowband interfering signals.

More particularly, the receiver comprises a receive section adapted to receive and downconvert RF input signals to intermediate frequency (IF) signals, and a received signal strength indicator coupled to the receive section and providing a receiver energy signal corresponding to the energy of the IF signals. A discrimination section receives the energy signal, and determines whether the RF input signals are narrowband or wideband by detecting the rate of increase of the integrated level of the receiver energy signal for a given bandwidth. The discrimination section further comprises a first threshold detector providing a first triggering signal upon the integrated level of the receiver energy signal reaching a first level, a second threshold detector providing a second triggering signal upon the integrated level of the receiver energy signal reaching a second level, and a timer providing a timing signal corresponding to elapsed time between the first and second triggering signal. The RF input signals comprise wideband signals when the timing signal is less than a predetermined value and narrowband signals when the timing signal is at least equal to the predetermined value.

A more complete understanding of the RF narrowband/wideband discriminating system for spread spectrum signal differentiation will be afforded to those skilled in the art, as well as a realization of additional advantages and objects thereof, by a consideration of the following detailed description of the preferred embodiment. Reference will be made to the appended sheets of drawings which will first be described briefly.

DETAILED DESCRIPTION OF THE PREFERRED EMBODIMENT

The present invention satisfies the need for a receiver which can discriminate between narrowband and wideband RF signals for use in an environment in which both types of signals are present.

Figure 1:
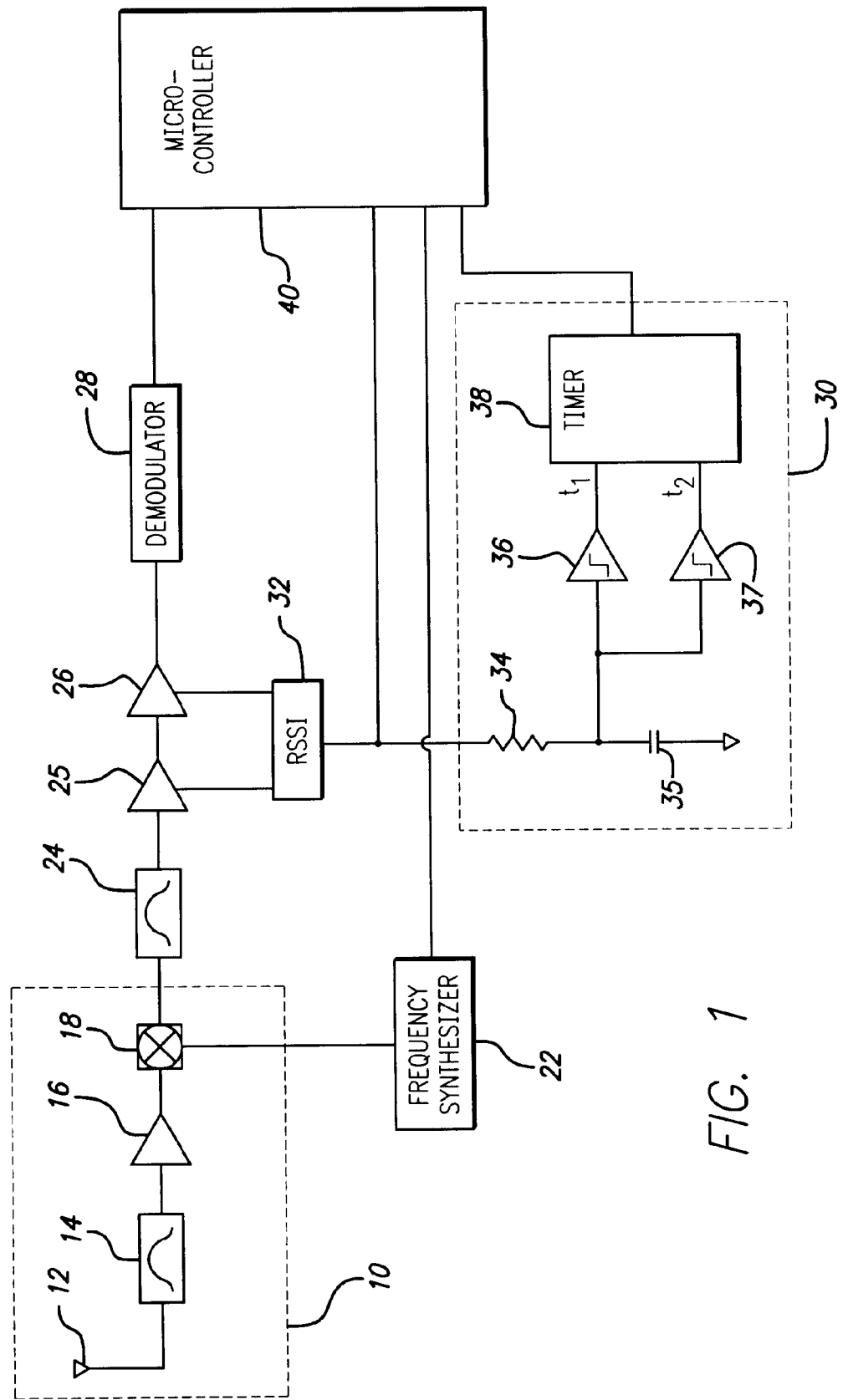
FIG. 1 is a block diagram of an RF receiver having a wideband/narrowband discrimination circuit in accordance with the present invention.

Referring first to FIG. 1, a block diagram of a computing device in accordance with an embodiment of the present invention is illustrated. The computing device may be adapted to communicate either or both narrowband (i.e., frequency-hopping) signals and wideband (i.e., direct-sequence) spread spectrum RF signals. An RF receive section 10 includes an antenna 12, a filter 14, a low noise amplifier stage 16, and a downconversion mixer 18. The antenna 12 is provided for receiving RF signals that are transmitted within the WLAN. The filter 14 rejects adjacent extraneous frequencies outside the bandwidth of the received band of signals. The low noise amplifier stage 16 amplifies the received and filtered signal to a desired amplitude level and establishes a system noise figure. The mixer 18 multiplies the amplified signal with a locally generated oscillating signal from a frequency synthesizer 22 to produce an intermediate frequency (IF) signal having a constant difference in frequency between the received signal and the locally generated signal.

By selecting a frequency of the oscillating signal that is equal to the carrier frequency of the received narrowband or wideband signals, the IF signal produced by the mixer 18 would actually be downconverted directly to baseband in the manner of a homodyne or zero-IF receiver. An example of a homodyne receiver is provided by U.S. Pat. No. 5,495,500, for "Homodyne Radio Architecture For Direct Sequence Spread Spectrum Data Reception," the subject matter of which is incorporated by reference herein.

The IF signal is provided to a bandpass filter 24 having a bandwidth sufficient to accommodate the wideband direct-sequence spread spectrum signals. IF amplifier stages 25, 26 are used to adjust the signal level of the filtered IF signal to a level sufficient for demodulation. The gain of the IF amplifier stages 25, 26 may be set at different levels depending on whether the received RF signal is a wideband or narrowband signal, as determined by the discrimination circuit described below. A demodulator 28 may be adapted to recover either or both frequency shift key (FSK) modulated signals from a frequency-hopping spread spectrum narrowband signal and direct-sequence wideband spread spectrum signal. Alternatively, separate demodulator circuits could be used for the narrowband and wideband signals that are selectively switched in the same manner as the bandpass filter 24 and IF amplifier stages 25, 26.

A microcontroller 40 provides the main signal processing hardware for the radio receiver, and is responsible for controlling the bandwidth selection, frequency synthesizer programming, clock recovery and data handling/generation. The microcontroller 40 may be provided by an application specific integrated circuit (ASIC), a microprocessor, a digital signal processor or other such circuit element. As known in the art, the microcontroller 40 performs its functions by executing a series of commands or instructions, also referred to as a software program, that may be disposed on a permanent storage medium, such as a semiconductor read only memory (ROM) device or a magnetic medium. The frequency synthesizer 22 communicates with the microcontroller 40 to control the timing and selection of carrier frequencies. The oscillating signal from the frequency synthesizer 22 is provided to the mixer 18 of the receive section 10 as the oscillating signal, as described above. The microcontroller 40 may also perform other functions for the computing device pertaining to the processing and use of the information communicated by the RF signals.

The IF amplifier stages 25, 26 further provide signals to a receiver strength signal indicator (RSSI) circuit 32 that operates as an IF signal envelope detector. More particularly, the RSSI 32 detects RF energy within the operating bandwidth of the communication device and generates an RSSI signal having a voltage proportional to the power of the detected RF energy. The RSSI signal is provided to the microcontroller 40, which uses the RSSI signal to control the gain of the IF amplifier stages 25, 26. A discrimination circuit 30 is also coupled to the output of the RSSI 32. The discrimination circuit 30 determines whether a received IF signal is a wideband or narrowband signal.

Figure 2:
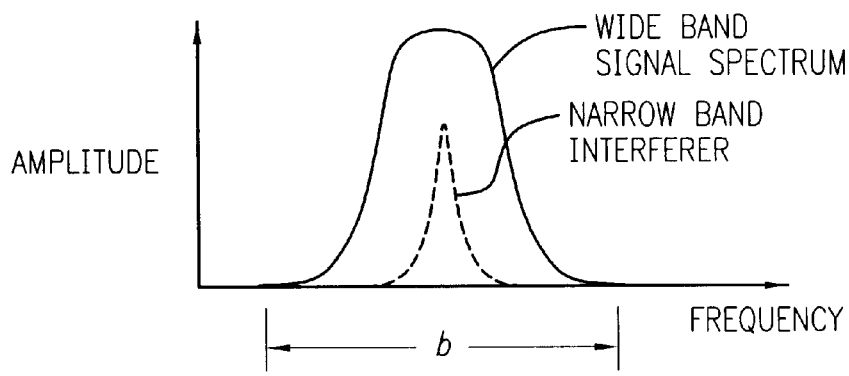
FIG. 2 is a graph illustrating the power spectrum of superimposed wideband and narrowband signals.

Before describing in detail the elements of the discrimination circuit 30, a brief discussion of the characteristics of wideband and narrowband signals is provided. In FIG. 2, the frequency spectra of a narrowband signal (illustrated in phantom) is superimposed over a corresponding frequency spectra of a wideband signal. The power of a wideband signal is spread over a wide band of frequencies (b). In contrast, the power of a narrowband signals is concentrated in a small frequency range. The narrowband signal may contain actual data being transmitted within the WLAN, or may be an interfering signal containing no actual data, such as noise.

Returning now to FIG. 1, the discrimination circuit 30 includes an integrating circuit comprising a resistor 34 and a capacitor 35 coupled in series between the RSSI 32 and ground. Electrical current passing through the resistor 34 charges the capacitor 35 to a voltage level that corresponds to an integrated sum of the RSSI signal. Alternatively, the integrating circuit may be provided by active components, such as an operational amplifier having a feedback capacitance applied between the output and inverting input terminals. A digital integrating circuit may also be utilized instead of analog components.

The discrimination circuit 30 further includes a first and second threshold detect circuit 36, 37 and a timer 38. The first and second threshold detect circuits 36, 37 provide a binary output that changes state when an input voltage crosses is a predetermined threshold. Particularly, when an input voltage is below a particular threshold, the threshold detect circuit provides a low signal (i.e., "zero"), and when an input voltage is above a particular threshold, the threshold detect circuit provides a high signal (i.e., "one"). The first and second threshold detect circuits 36, 37 are selected to trigger at different input voltage levels, as will be further described below.

More particularly, the first threshold detect circuit 36 triggers upon the integrated value of the RSSI signal measured across the capacitor 35 reaching a first threshold voltage level, providing trigger signal $t_1$. The second threshold detect circuit 37 triggers upon the integrated value of the RSSI signal measured across the capacitor 35 reaching a second, higher threshold voltage level, providing trigger signal $t_2$. The timer 38 receives the trigger signals $t_1$, $t_2$ from the threshold detect circuits 36, 37. The $t_1$, trigger signal starts the timer 38, and the $t_2$ trigger signal stops the timer. The timer 38 provides an output signal $t_3$ to the microcontroller 40 corresponding to the time interval between the triggering of the threshold detect circuits, i.e., $t_2-t_1$. It should be appreciated that the output signal $t_3$ is inversely proportional to the rate of increase, or slope, of the integrated voltage level of the RSSI signal; since the threshold voltage levels comprise known amplitude values, the slope is determined by dividing the difference between the threshold levels by the time interval defined by output signal $t_3$.

The microcontroller 40 then compares $t_3$ with a predetermined discrimination time value $t_D$ to determine whether the received signal comprises a wideband or narrowband signal. If $t_3$ is less than $t_D$, then a wideband signal is present since the integrated values of the RSSI signal increases relatively quickly reflecting the presence of a high level of energy in the received signal.

Figure 3A:
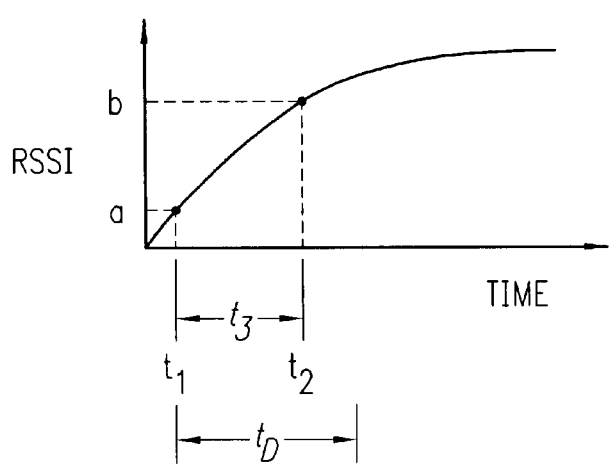
FIGS. 3(a) and 3(b) are graphs illustrating the integrated signal strength of wideband and narrowband signals, respectively.
Figure 3B:
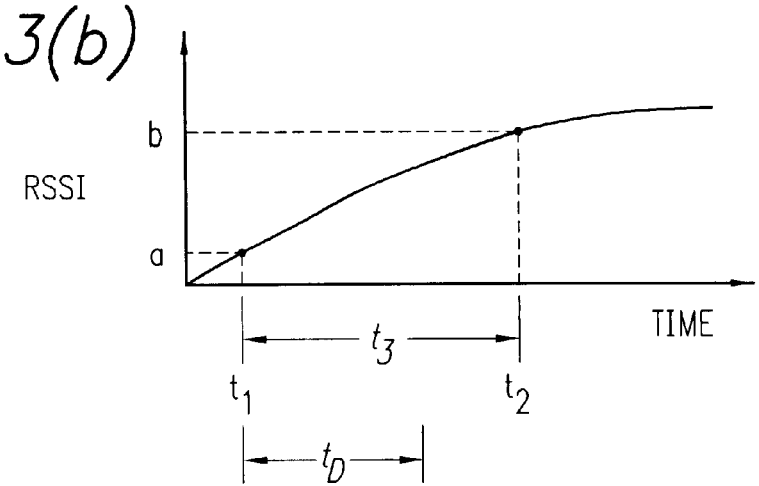

This is reflected in FIG. 3(a), which illustrates an RSSI signal that rises quickly, or has a relatively high slope that is greater than a predefined slope value, producing a relatively short interval $t_3$ that is less than $t_D$. Alternatively, if $t_3$ is equal to or greater than $t_D$, then a narrowband signal is present since the integrated values of the RSSI signal increases relatively slowly reflecting the presence of a low level of energy in the received signal. This is reflected in FIG. 3(b), which illustrates an RSSI signal that rises slowly, or has a relatively low slope that is equal to or less than a predefined slope value, producing a relatively long interval $t_3$ that is equal to or greater than $t_D$. The microcontroller 40 then controls the frequency synthesizer 22, the demodulator 28, and the IF amplifier stages 25, 26 as described above.

As known in the art, the received signal may additionally include two signal components, called the I channel and the Q channel, having phases that are 90° from each other. The separate I and Q signal components would be downconverted and filtered in the same manner described above to yield multiple-bit digital signals. It should be appreciated that these and other well known aspects of an RF receiver would be included in an operational system. To simplify the present detailed description, description of these well known aspects is omitted.

Even though analog processing circuitry for the discrimination circuit 30 has been described above with respect to FIG. 1, it should also be appreciated that digital processing circuitry may also be advantageously utilized. Particularly, the RSSI signal from the RSSI 32 may be passed through a digital-to-analog converter to provide a digital signal. Digital circuit elements would then operate on the digital signal, including digital integration and threshold detection stages. The digital circuit elements may be provided as separate discrete components. Alternatively, the functions provided by these digital circuit elements, as well as the timer 38, may be included within the microcontroller 40 either as embedded circuit elements or as software instructions executed by the microcontroller.

Having thus described a preferred embodiment of an RF narrowband/wideband discriminating system for spread spectrum signal differentiation, it should be apparent to those skilled in the art that certain advantages of the within described system have been achieved. It should also be appreciated that various modifications, adaptations, and alternative embodiments thereof may be made within the scope and spirit of the present invention. The invention is further defined by the following claims.

What is claimed is:

1. A receiver for use in an environment in which both narrowband and wideband radio frequency (RF) signals are present, comprising:

a receive section adapted to receive and downconvert RF input signals to intermediate frequency (IF) signals;

a received signal strength indicator coupled to said receive section and providing a receiver energy signal corresponding to the energy of the IF signals;

a discrimination section coupled to said receiver energy signal and adapted to detect a rate of increase of an integrated sum of said receiver energy signal and provide a timing signal corresponding to said rate of increase; and a controller responsive to said timing signal to discriminate between wideband and narrowband RF signals by comparing said timing signal with a predetermined value.

2. The receiver of claim 1, wherein said discrimination section further comprises a first threshold detector providing a first triggering signal upon said integrated sum of said receiver energy signal reaching a first level, a second threshold detector providing a second triggering signal upon said integrated sum of said receiver energy signal reaching a second level, and a timer providing said timing signal corresponding to elapsed time between receipt of said first and second triggering signals.

3. The receiver of claim 1, further comprising a demodulator coupled to said receive section and said controller, said demodulator recovering data from said IF signals, said controller modifying operation of said demodulator in accordance with said discrimination between wideband and narrowband RF signals.

4. The receiver of claim 1, wherein said RF input signals comprise wideband signals when said timing signal is less than said predetermined value and narrowband signals when said timing signal is at least equal to said predetermined value.

5. The receiver of claim 1, wherein said discrimination section further comprise a integrator coupled to said received signal strength indicator to provide said integrated sum of said receiver energy signal.

6. The receiver of claim 5, wherein said integrator further comprises a capacitor.

7. The receiver of claim 5, wherein said integrator further comprises an operational amplifier.

8. The receiver of claim 5, wherein said integrator further comprises a digital integrator.

9. The receiver of claim 1, wherein said wideband RF signals further comprise direct-sequence spread spectrum signals.

10. The receiver of claim 1, wherein said narrowband RF signals further comprise frequency-hopping spread spectrum signals.

11. A receiver for use in an environment in which both narrowband and wideband radio frequency (RF) signals are present, comprising:

means for receiving and downconverting RF input signals to intermediate frequency (IF) signals;

means for detecting an energy level of said IF signals; and means for discriminating said RF input signals between narrowband and wideband signals by detecting a rate of increase of an integrated sum of said detected energy level;

wherein, said RF input signals comprise wideband signals when said rate of increase is greater than a predetermined value and narrowband signals when said rate of increase is equal to or less than said predetermined value.

12. The receiver of claim 11, further comprising a demodulator coupled to said receiving means, said demodulator recovering data from said IF signals in accordance with said discrimination between wideband and narrowband RF signals.

13. The receiver of claim 11, wherein said discriminating means further comprises means for detecting a first threshold level of said integrated sum of said detected energy level, means for detecting a second threshold level of said integrated sum of said detected energy level, means for determining elapsed time between occurrence of said first and second threshold levels, and means for comparing said elapsed time against said predetermined value.

14. The receiver of claim 11, wherein said discriminating means further comprise an integrator coupled to said detecting means to provide an integrated value of said detected energy level.

15. The receiver of claim 14, wherein said integrator further comprises a capacitor.

16. The receiver of claim 11, wherein said wideband RF signals further comprise direct-sequence spread spectrum signals.

17. The receiver of claim 11, wherein said narrowband RF signals further comprise frequency-hopping spread spectrum signals.

18. In an environment in which both narrowband and wideband radio frequency (RF) signals are present, a method for receiving data comprises:

receiving and downconverting RF input signals to intermediate frequency (IF) signals;

detecting the energy of said IF signals;

detecting a rate of increase of an integrated sum of said detected energy; and discriminating said RF input signals between narrowband and wideband signals by comparing said rate of increase against a predetermined value, wherein said RF input signals comprise wideband signals when said rate of increase is greater than said predetermined value and narrowband signals when said rate of increase is equal to or less than said predetermined value.

19. The method of claim 18, wherein said step of discriminating said RF input signals further comprises detecting a first threshold level of said integrated sum of said detected energy and a second threshold level of said integrated sum of said detected energy, and determining elapsed time between occurrence of said first and second threshold levels.

20. The method of claim 18, further comprising recovering data from said IF signals in accordance with said discrimination between wideband and narrowband RF signals.

* * * * *